United States Patent

Crago

[11] B 4,000,710
[45] Jan. 4, 1977

[54] AIR CUSHION VEHICLES

[75] Inventor: William Arthur Crago, Cowes, England

[73] Assignee: British Hovercraft Corporation Limited, Yeovil, England

[22] Filed: July 18, 1974

[21] Appl. No.: 489,550

[44] Published under the second Trial Voluntary Protest Program on March 16, 1976 as document No. B 489,550.

[30] Foreign Application Priority Data

July 19, 1973 United Kingdom ............ 34462/73

[52] U.S. Cl. .............................. 114/67 A; 180/126
[51] Int. Cl.² .......................................... B60V 1/04
[58] Field of Search ................. 114/67 R, 67 A, 61, 114/56, 66.5 S, 66.5 F, 40, 41; 180/116, 126

[56] References Cited
UNITED STATES PATENTS

| | | | |
|---|---|---|---|
| 2,322,790 | 6/1943 | Cristadoro | 114/67 R |
| 3,410,241 | 11/1968 | Hardy et al. | 114/67 A |
| 3,621,932 | 11/1971 | Tattersal et al. | 114/67 A |
| 3,650,235 | 3/1972 | Swanson | 114/67 A |

*Primary Examiner*—Trygve M. Blix
*Assistant Examiner*—Charles E. Frankfort
*Attorney, Agent, or Firm*—Larson, Taylor and Hinds

[57] ABSTRACT

In an air cushion vehicle of the type having a pair of rigid sidewall structures extending longitudinally along the sides of the vehicle body and depending downwardly therefrom so as to dip into the water and provide a cushion seal at the sides of the vehicle, wedge shaped members are provided at the forward ends of the sidewalls on those parts of the outer surfaces which dip into the water so that in operation the wedge shaped members break up the flow of water over these surfaces.

5 Claims, 5 Drawing Figures

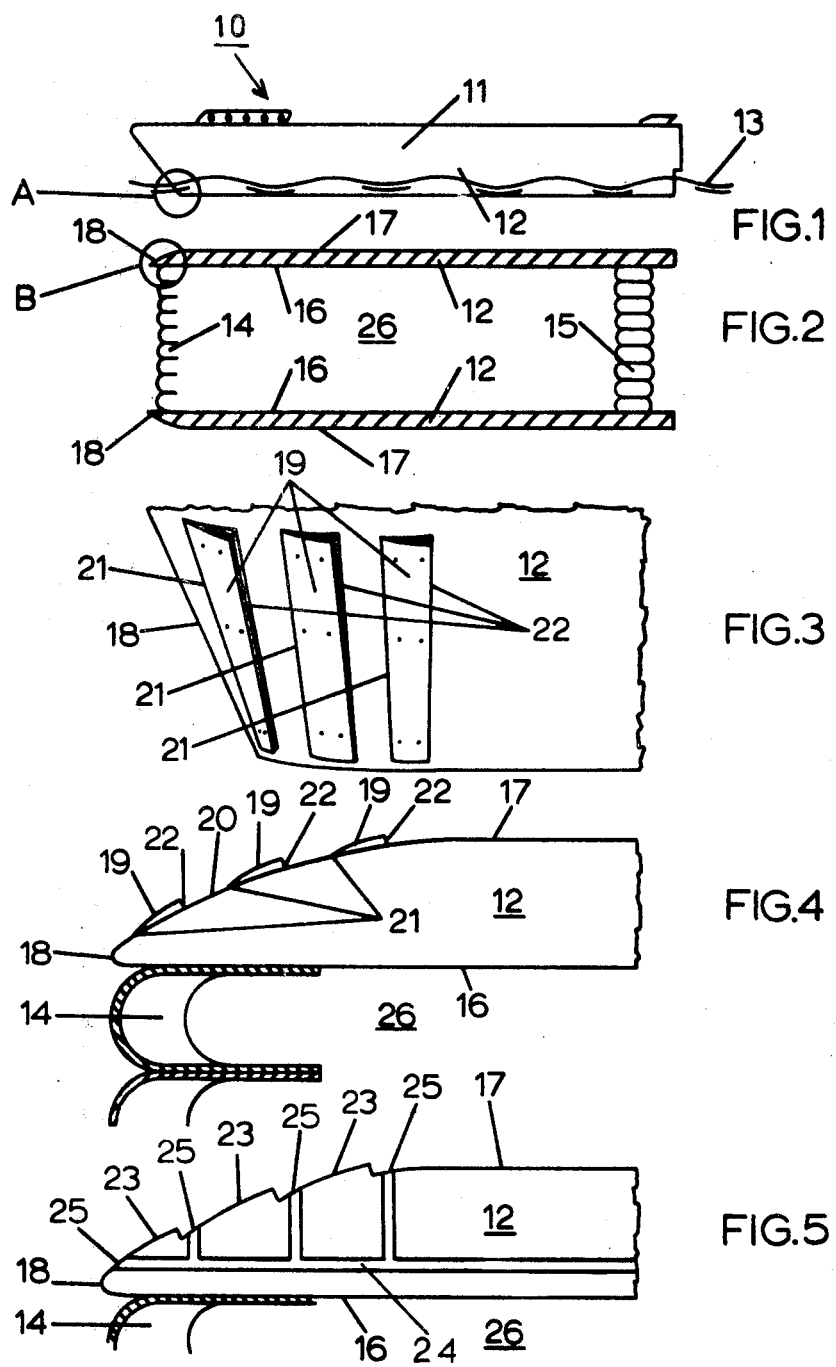

AIR CUSHION VEHICLES

This invention relates to air cushion vehicles, more particularly to vehicles for travelling over water and which, in operation, are supported above the water, at least in part, by a cushion of pressurised air formed beneath the vehicle body, the sides of the cushion being contained by a pair of rigid "sidewall" structures extending longitudinally along the sides of the vehicle body and depending therefrom so as to dip into the water and provide a cushion seal. Cushion seals extending between the sidewalls at the front and rear ends of the vehicle are arranged to flex to allow waves and other obstructions to pass between the rigid sidewalls as the vehicle travels forwards.

In a sidewall air cushion vehicle the forward end of each sidewall is generally shaped to an edge in order to reduce its drag through the water. Since the inner surface of each sidewall has to co-operate with the front cushion seal to prevent escape of air from the cushion it is usual for this inner surface to be straight and for the outer surface at the forward end of each sidewall to taper or curve inwardly to meet with the inner surface at the leading edge of the sidewall.

A curved or angled surface having movement relative to a fluid produces a force normal to the direction of movement, and because the shape of the forward end of each sidewall is asymmetric a net differential force is produced in each sidewall substantially at right angles to the normal direction of travel of the vehicle. This net differential force, which has to be absorbed by the structure of the sidewall and the vehicle body, can become significant in the large, high speed, type of sidewall air cushion vehicles presently being proposed known as surface effect ships.

The present invention provides an air cushion vehicle for travelling over water and which, in operation, is supported above the water, at least in part, by a cushion of pressurised air formed beneath the vehicle body, the side of the cushion being contained by a pair of sidewall structures extending longitudinally along the sides of the vehicle body and depending downwardly therefrom so as to dip into the water and provide a cushion seal, each sidewall having inner and outer surfaces with respect to the cushion, the outer surface inclining inwardly when viewed in plan to meet with the inner surface at the forward end of each sidewall, wherein wedge shaped members are provided on the inclined parts of the outer surfaces at the forward ends of the sidewalls, the wedge shaped members being arranged on those portions of the inclined outer surfaces which dip into the water so that in operation they break up the flow of water over these surfaces.

Preferably the wedge shaped members are arranged normal to the direction of flow of water past the sidewall.

The inclination of the outer surface to meet with the inner surface at the forward end of each sidewall may be curved. Alternatively the outer surface may be tapered towards the inner surface along a straight line.

The wedge shaped members may be attached to the inclined part of the outer surface or the surface may be formed with one or more steps so as to provide wedges arranged normal to the direction of flow of water past the surface. It is an object of the present invention to substantially reduce the forces normal to the direction of motion produced at the forward ends of the sidewalls of a sidewall air cushion vehicle Some embodiments of the invention will now be described, by way of example only, with reference to the accompanying drawings, in which:

FIG. 1 is a schematic side elevation of a sidewall air cushion vehicle,

FIG. 2 is an inverted plan of the sidewall air cushion vehicle illustrated in FIG. 1, FIG. 3 is a scrap perspective enlargement of that part of the sidewall of the vehicle shown within the circle A in FIG. 1, illustrating a first embodiment of the invention, FIG. 4 is a scrap enlargement of that part of the sidewall of the vehicle shown within the circle B in FIG. 2 illustrating a first embodiment of the invention, and FIG. 5 is a view similar to that of FIG. 4 illustrating a second embodiment of the invention.

Referring first to FIGS. 1 and 2 of the accompanying drawings, a sidewall air cushion vehicle 10 for travelling over a water surface 13 is supported above the water by a cushion of pressurised air 26 formed beneath the vehicle body 11. The pressurised air for the cushion 26 is provided by one or more fans (not shown) provided on the vehicle and driven by one or more engines (not shown). The sides of the cushion 26 are contained by a pair of rigid sidewall structures 12 extending longitudinally along the sides of the vehicle body 11 and depending downwardly therefrom so as to dip into the water surface 26 and provide a cushion seal. Flexible seals 14 and 15, being of any of the constructions well known within the art, depend from the vehicle body 11 so as to extend between the sidewalls 12 at the front and rear ends of the vehicle.

Each sidewall 12 has an inner surface 16 and an outer surface 17, with respect to the cushion 26.

The inner surface 16 of each sidewall 12 is straight so that it may co-operate efficiently with the flexible front and back seals 14 and 15, respectively. At the forward end of each sidewall 12 the outer surface 17 when viewed in plan inclines inwardly along a curved path to meet with the inner surface 16 and form a narrow leading edge 18.

In a first embodiment of the invention, illustrated in FIGS. 3 and 4, wedge shaped members 19 are fixed to the curved part 20 of the outer surface 17 of each sidewall 12 by bonding, rivetting or other suitable means (not shown). The wedge shaped members 19 are arranged so that the narrow part 21 of the wedge is towards the front of the vehicle and the wide part 22 of the wedge is towards the rear of the vehicle. The wedge shaped members 19 extend downwardly so as to be parallel with the leading edge 18 of the sidewall 12.

In operation of the vehicle the wedge shaped members 19 break the flow of water over the immersed portion of the curved part 20 of the outer surface 17 at the forward end of each sidewall 12 and this reduces the force on the sidewall 12 normal to its direction of motion through the water.

In a second embodiment of the invention, illustrated in FIG. 5, the curved part of the sidewall 12 is fabricated from, for example, glass reinforced plastics, and a series of shallow steps 23 formed as an integral part of the outer surface act as the wedge shaped members.

In this embodiment means represented by the ducts 24 are provided to expel air or friction reducing substances from orifices 25 situated in the curved part of each sidewall 12. The air may be bled from the air cushion 26 which supports the vehicle 10 or supplied from a compressor (not shown). Alternatively, friction reducing substance carried on the vehicle in a container (not shown) may be ejected either continuously or intermittently from the orifices 25.

It will be appreciated that the invention is not limited to the embodiment hereinbefore described with reference to the accompanying drawings, modifications being possible which are within the scope of the invention. For example, the outer surface of the sidewall may incline towards the inner surface along a straight line path rather than a curved path. The wedge shaped members may be angled to the leading edge of the sidewall and to each other. Furthermore, the invention is equally applicable to those vehicles known as surface effect ships which receive support from a cushion of pressurised air and have rigid sidewall members extending downwardly from the vehicle body to penetrate a water surface over which the vehicle is travelling.

I claim as my invention:

1. An air cushion vehicle for travelling over water and which, in operation, is supported above the water, at least in part, by a cushion of pressurised air formed beneath the vehicle body, the sides of the cushion being contained by a pair of rigid sidewall structures rigid with the vehicle body and extending longitudinally along the sides of the vehicle body and depending downwardly therefrom so as to dip into the water to a depth such that under normal operation they are always immersed in the water and provide a cushion seal along the sides of the vehicle, each sidewall having inner and outer surfaces with respect to the cushion, the outer surface inclining inwardly when viewed in plan to meet with the inner surface thereof at the forward end of each sidewall, said inner surface at the forward end, when viewed in plan, being substantially straight and substantially parallel to the center line of the vehicle body, a flexible cushion seal extending across the front of the vehicle and of a height which permits water to flow thereunder such that under normal operation water flows along both the inner and outer surfaces of each sidewall, and a cushion seal extending across the rear of the vehicle between said rigid sidewalls, wherein wedge shaped members are provided on the inclined parts of the outer surfaces at the forward end of the sidewalls, the wedge shaped members being arranged on those portions of the inclined outer surfaces which dip into the water and constituting means for reducing the net differential force exerted on the front ends of each sidewall in a direction normal to the direction of motion of the vehicle by breaking up the flow of water over said inclined parts of the outer surfaces as the vehicle travels over the water.

2. An air cushion vehicle as claimed in claim 1, wherein the outer surface of each sidewall when viewed in plan inclines inwardly along a curved path to meet with the inner surface at the forward end of the sidewall.

3. An air cushion vehicle as claimed in claim 1, wherein the wedge shaped members extend downwardly so as to be parallel to the front end of each sidewall.

4. An air cushion vehicle as claimed in claim 1, wherein the wedge shaped members are formed as an integral part of the outer surface of each sidewall.

5. An air cushion vehicle as claimed in claim 1, wherein orifices defined by the outer surfaces between the wedge shaped members are connected by ducts in the sidewalls to means on the vehicle for expelling a friction reducing substance through the orifices to the other surfaces at the front ends of the sidewalls.

* * * * *